United States Patent
Slavens et al.

(10) Patent No.: US 10,830,096 B2
(45) Date of Patent: Nov. 10, 2020

(54) ROTATING TURBINE VANE BEARING COOLING

(71) Applicant: UNITED TECHNOLOGIES CORPORATION, Hartford, CT (US)

(72) Inventors: Thomas N. Slavens, Vernon, CT (US); Steven Bruce Gautschi, Naugatuck, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 700 days.

(21) Appl. No.: 14/917,434

(22) PCT Filed: Sep. 22, 2014

(86) PCT No.: PCT/US2014/056713
§ 371 (c)(1),
(2) Date: Mar. 8, 2016

(87) PCT Pub. No.: WO2015/050730
PCT Pub. Date: Apr. 9, 2015

(65) Prior Publication Data
US 2016/0222825 A1 Aug. 4, 2016

Related U.S. Application Data

(60) Provisional application No. 61/886,236, filed on Oct. 3, 2013.

(51) Int. Cl.
*F01D 25/12* (2006.01)
*F01D 17/16* (2006.01)
(Continued)

(52) U.S. Cl.
CPC ........... *F01D 25/125* (2013.01); *F01D 5/187* (2013.01); *F01D 9/041* (2013.01); *F01D 17/14* (2013.01);
(Continued)

(58) Field of Classification Search
CPC ........ F01D 25/12; F01D 25/125; F01D 25/16; F01D 5/186; F01D 5/187; F01D 17/12;
(Continued)

(56) References Cited

U.S. PATENT DOCUMENTS 3,224,194 A * 12/1965 De Feo ................... F01D 5/08
415/115
3,542,484 A * 11/1970 Mason .................. F01D 17/162
415/147
(Continued)

FOREIGN PATENT DOCUMENTS

| CN | 102454431 A | 5/2012 | |
|---|---|---|---|
| WO | 2014113039 A1 | 7/2014 | |
| WO | WO-2014113039 A1 * | 7/2014 | ............. F01D 5/145 |

OTHER PUBLICATIONS

International Search Report from corresponding PCT/US14/56713.
(Continued)

*Primary Examiner* — David E Sosnowski
*Assistant Examiner* — Wayne A Lambert
(74) *Attorney, Agent, or Firm* — Carlson, Gaskey & Olds, P.C.

(57) ABSTRACT

A pivoting turbine vane has an airfoil, an inner bearing race and an outer bearing race, with the inner and outer bearing races on a pivot axis of the pivoting turbine vane. There are cooling air passages through at least one of the inner and outer bearing races to provide cooling air from a remote facing face of at least one of the inner and outer bearing races to an airfoil facing face of at least one of the inner and outer bearing races. A turbine section is also disclosed.

6 Claims, 3 Drawing Sheets

(51) Int. Cl.
  *F01D 5/18* (2006.01)
  *F01D 9/04* (2006.01)
  *F01D 17/14* (2006.01)
  *F01D 25/16* (2006.01)

(52) U.S. Cl.
  CPC ........... *F01D 17/162* (2013.01); *F01D 25/16* (2013.01); *F05D 2220/32* (2013.01); *F05D 2240/81* (2013.01); *F05D 2250/314* (2013.01); *F05D 2250/38* (2013.01); *F05D 2260/20* (2013.01); *F05D 2260/2212* (2013.01); *Y02T 50/60* (2013.01)

(58) Field of Classification Search
  CPC ........ F01D 17/14; F01D 17/162; F01D 9/041; F05D 2240/81; F05D 2250/314; F05D 2250/38; F05D 2260/20; F05D 2260/2212; Y02T 50/676
  See application file for complete search history.

(56) References Cited

U.S. PATENT DOCUMENTS

| | | | | |
|---|---|---|---|---|
| 3,652,177 A * | 3/1972 | Loebel | ................. | F01D 17/162 415/110 |
| 3,995,971 A * | 12/1976 | White | ................. | F01D 17/162 415/160 |
| 4,025,227 A * | 5/1977 | Greenberg | ............ | F01D 17/162 415/160 |
| 4,193,738 A * | 3/1980 | Landis, Jr. | ............ | F01D 11/005 415/115 |
| 4,856,962 A * | 8/1989 | McDow | ................. | F01D 17/162 415/115 |
| 4,861,228 A * | 8/1989 | Todman | ................. | F01D 17/162 415/115 |
| 5,169,287 A * | 12/1992 | Proctor | ................... | F01D 5/182 415/115 |
| 5,361,828 A * | 11/1994 | Lee | ......................... | F01D 5/187 165/109.1 |
| 5,584,651 A * | 12/1996 | Pietraszkiewicz | ...... | F01D 11/08 415/115 |
| 5,749,660 A * | 5/1998 | Dusserre-Telmon | ........................ | F16C 19/166 384/475 |
| 6,176,678 B1 * | 1/2001 | Brainch | ................. | F01D 5/186 416/96 R |
| 6,341,939 B1 * | 1/2002 | Lee | ........................... | F01D 5/18 415/115 |
| 6,802,692 B2 * | 10/2004 | Bouru | .................... | F01D 17/16 403/286 |
| 7,967,556 B2 * | 6/2011 | Gummer | ............. | F04D 27/0215 415/144 |
| 8,052,390 B1 * | 11/2011 | Liang | ..................... | F01D 5/186 416/97 R |
| 8,182,209 B2 * | 5/2012 | Brault | ................... | F01D 17/105 415/144 |
| 8,491,254 B2 * | 7/2013 | Domercq | .............. | F01D 17/162 415/115 |
| 2002/0182065 A1 | 12/2002 | Schipani et al. | | |
| 2003/0026693 A1 * | 2/2003 | Schipani | ................. | F01D 5/143 415/160 |
| 2004/0107538 A1 | 6/2004 | Ciacci et al. | | |
| 2005/0232756 A1 | 10/2005 | Cormier et al. | | |
| 2005/0286824 A1 * | 12/2005 | Garcia | .................. | F16C 19/163 384/476 |
| 2007/0020100 A1 * | 1/2007 | Beeck | ..................... | F01D 5/147 416/193 A |
| 2007/0048136 A1 | 3/2007 | Boury et al. | | |
| 2007/0234733 A1 * | 10/2007 | Harris | ..................... | F01D 25/12 60/776 |
| 2008/0273972 A1 * | 11/2008 | Bagnall | ................... | F01D 5/143 415/208.1 |
| 2008/0298951 A1 | 12/2008 | Brault et al. | | |
| 2009/0097966 A1 | 4/2009 | McCafffrey | | |
| 2009/0202339 A1 * | 8/2009 | Torii | ......................... | F01D 5/18 415/115 |
| 2009/0269187 A1 * | 10/2009 | Jones | .................... | F01D 17/162 415/159 |
| 2010/0232935 A1 | 9/2010 | Twell | | |
| 2011/0072829 A1 * | 3/2011 | Bil | ............................ | F02C 9/18 60/785 |
| 2012/0093632 A1 * | 4/2012 | Crespo | ..................... | F01D 9/04 415/151 |
| 2012/0263571 A1 * | 10/2012 | Ress, Jr. | ................ | F01D 17/162 415/1 |
| 2015/0125310 A1 * | 5/2015 | Tagawa | .................. | F01D 5/082 416/97 R |

OTHER PUBLICATIONS

International Preliminary Report on Patentability for International Application No. PCT/US2014/056713 dated Apr. 14, 2016.
Supplementary European Search Report for European Application No. 14850855.9 dated Sep. 22, 2016.

* cited by examiner

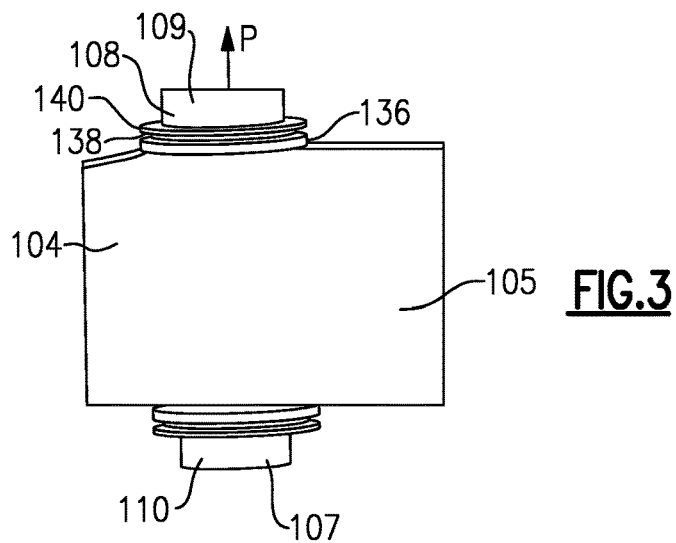
FIG.3
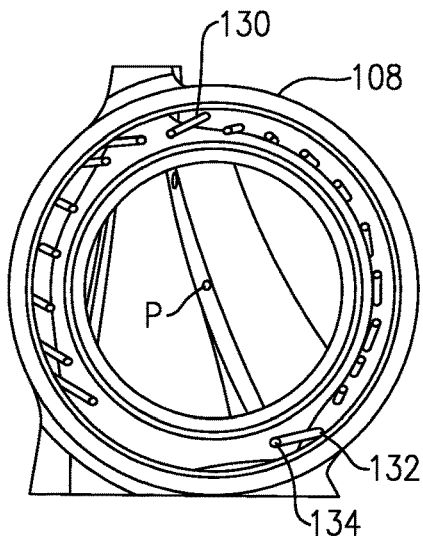
FIG.4A
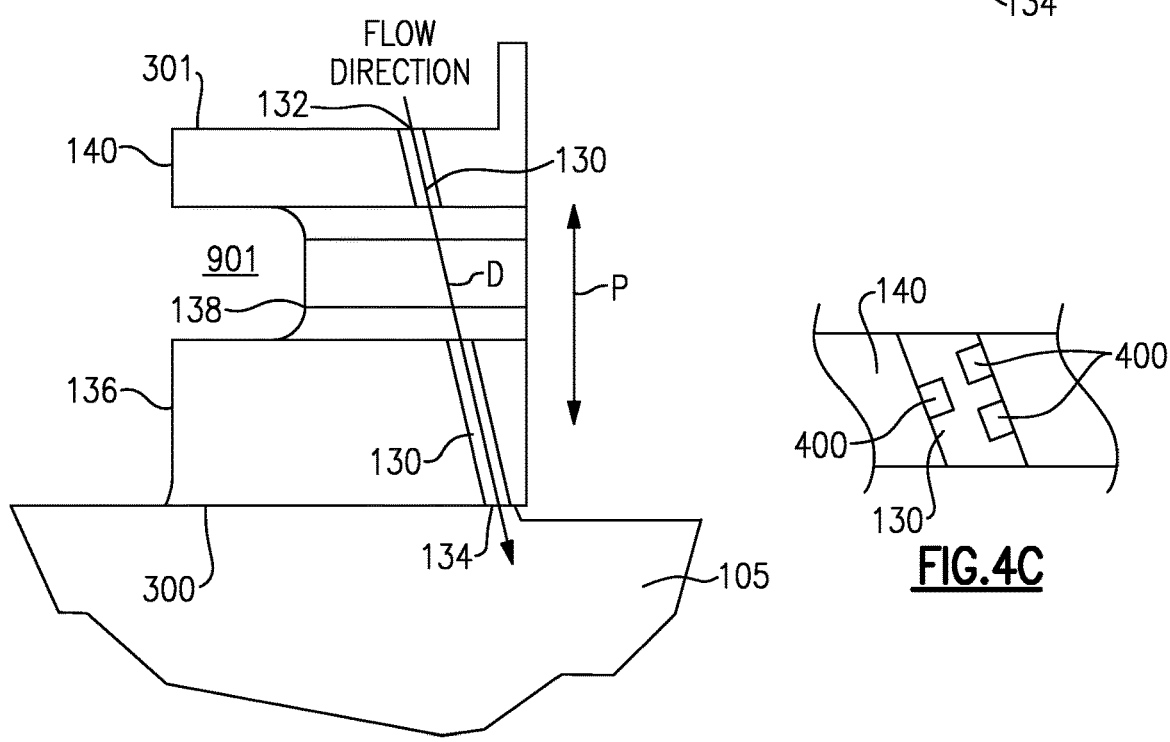
FIG.4B
FIG.4C

ROTATING TURBINE VANE BEARING COOLING

CROSS-REFERENCED TO RELATED APPLICATION

This application claims priority to U.S. Provisional Application No. 61/886,236, filed Oct. 3, 2013.

STATEMENT REGARDING FEDERALLY SPONSORED RESEARCH OR DEVELOPMENT

This invention was made with government support under Contract No. N00014-09-D-0821-0006, awarded by the United States Navy. The Government has certain rights in this invention.

BACKGROUND

This application relates to the cooling of a pivot bearing on a rotating turbine vane.

Gas turbine engines are known and, typically, include a fan delivering air into a bypass duct and into a core duct. Air in the bypass duct is utilized as propulsion air, for cooling and for other purposes. The air passing into the core duct moves to a compressor where it is compressed and then into a combustor. In the combustor compressed air is mixed with fuel and ignited. Products of this combustion pass downstream over turbine rotors driving them to rotate.

It is known to vary the volume of air delivered into the bypass duct compared to the volume of air delivered into the core flow during various flight conditions. To achieve this goal, it is has recently been proposed to utilize pivoting turbine vanes upstream of an upstream most one of the turbine rotors. By pivoting an airfoil on the pivoting vane, the resistance to flow across the vane may vary. It is known to pivot the turbine vane under various flow conditions to assist in achieving the different bypass volumes.

Turbine vanes are exposed to very hot temperatures and it is known to provide cooling air to the turbine vanes. However, bearing races on the vane are also exposed to high temperatures through contact conductance of heat from the rotating turbine vanes These bearings are placed between the rotating vanes and the vane platform. The rotating vanes are in direct contact with the hot exhaust gasses. The vane platforms are bathed in coolant air.

SUMMARY

In a featured embodiment, a pivoting turbine vane has an airfoil, an inner bearing race and an outer bearing race, with the inner and outer bearing races on a pivot axis of the pivoting turbine vane. There are cooling air passages through at least one of the inner and outer bearing races to provide cooling air from a remote facing face of at least one of the inner and outer bearing races to an airfoil facing face of at least one of the inner and outer bearing races.

In another embodiment according to the previous embodiment, both of the inner and outer bearing races are provided with the cooling air passages.

In another embodiment according to any of the previous embodiments, the cooling air passages include the inner and outer bearing races provided with a plurality of cooling channels extending from the remote facing face to the airfoil facing face.

In another embodiment according to any of the previous embodiments, a direction of air passing through the cooling channels from an inlet to an outlet is not parallel to a pivot axis of the vane, and the direction includes a component parallel to the pivot axis and another component, which extends radially toward the pivot axis.

In another embodiment according to any of the previous embodiments, the direction also includes a circumferentially extending angle from the inlet to the outlet, such that air delivered outwardly of the outlet may be directed along an outer surface of the airfoil as film cooling.

In another embodiment according to any of the previous embodiments, the direction also includes a circumferentially extending angle from the inlet to the outlet, such that air delivered outwardly of the outlet may be directed along an outer surface of the airfoil as film cooling.

In another embodiment according to any of the previous embodiments, the cooling air passages include cooling channels having an inlet extending into the remote facing face and an outlet in the airfoil facing face.

In another embodiment according to any of the previous embodiments, the bearing race includes a first radially thicker portion adjacent the airfoil, and includes the airfoil facing face. A second radially thicker portion is spaced in a direction away from the airfoil from the first radially thicker portion, with the cooling channels extending through both the first and second radially thicker portions.

In another embodiment according to any of the previous embodiments, a direction of air passing through the cooling channels from the inlet to the outlet is not parallel to a pivot axis of the vane.

In another embodiment according to any of the previous embodiments, the direction includes a component parallel to the pivot axis and another component, which extends radially toward the pivot axis.

In another embodiment according to any of the previous embodiments, the direction also includes a circumferentially extending angle from the inlet to the outlet, such that air delivered outwardly of the outlet may be directed along an outer surface of the airfoil as film cooling.

In another embodiment according to any of the previous embodiments, the cooling channels include convective heat transfer augmentation features.

In another featured embodiment, a turbine section for a gas turbine engine has a turbine rotor and a pivoting turbine vane positioned upstream of the turbine rotor. The pivoting turbine vane includes an airfoil, an inner bearing race and an outer bearing race, with the inner and outer bearing races on a pivot axis of the pivoting vane. There are cooling air passages through at least one of the inner and outer bearing races to provide cooling air from a remote facing face of at least one of the inner and outer bearing races to an airfoil facing face of at least one of the inner and outer bearing races.

In another embodiment according to the previous embodiment, both of the inner and outer bearing races are provided with the cooling air passages.

In another embodiment according to any of the previous embodiments, the cooling air passages include the inner and outer bearing races provided with a plurality of cooling channels extending from the remote facing face to the airfoil facing face.

In another embodiment according to any of the previous embodiments, a direction of air passing through the cooling channels from an inlet to an outlet is not parallel to a pivot axis of the vane. The direction includes a component parallel to the pivot axis and another component, which extends radially toward the pivot axis.

In another embodiment according to any of the previous embodiments, wherein convective cooling is utilized through the passed through air to produce a heat sink separating the hot portions of the turbine vane from the bearing race such that the outwardly radial portions of the race and turning vane assembly is thermally isolated.

In another embodiment according to any of the previous embodiments, the cooling channels include convective heat transfer augmentation features.

In another embodiment according to any of the previous embodiments, an actuator is provided for pivoting the turbine vane with the actuator provided outwardly of one of the inner and outer bearing races relative to the airfoil.

In another embodiment according to any of the previous embodiments, the bearing races include a first radially thicker portion adjacent the airfoil, and include the airfoil facing face, and a second radially thicker portion spaced in a direction away from the airfoil from the first radially thicker portion, with the cooling channels extending through both the first and second radially thicker portions. A direction of air passing through the cooling channels from the inlet to the outlet is not parallel to a pivot axis of the vane, and the direction includes a component parallel to the pivot axis and another component, which extends radially toward the pivot axis.

These and other features may be best understood from the following drawings and specification.

BRIEF DESCRIPTION OF THE DRAWINGS

FIG. 3 shows a vane.
FIG. 4A shows a bearing race.
FIG. 4B is a cross-sectional view through a portion of FIG. 4A.
FIG. 4C shows an optional feature.

DETAILED DESCRIPTION

Figure 1:
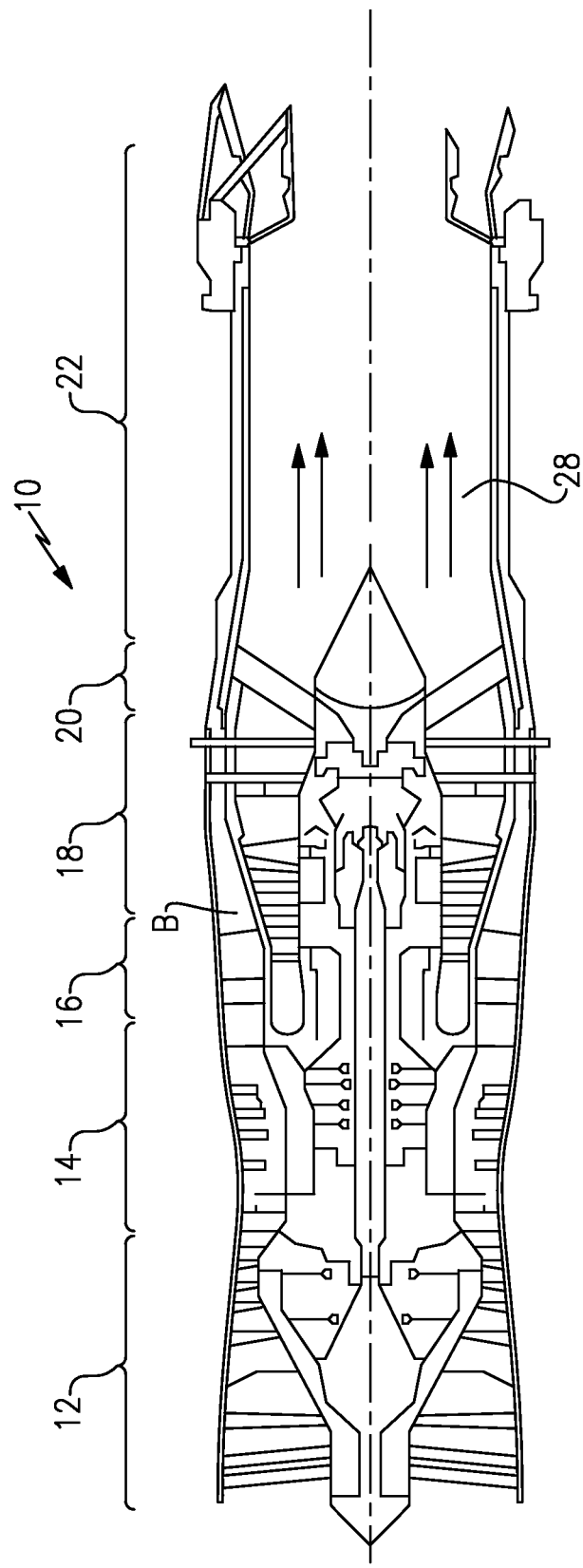
FIG. 1 schematically shows a gas turbine engine.

Referring to FIG. 1, a gas turbine engine 10 includes a fan section 12, a compressor section 14, a combustor section 16, and a turbine section 18. Air entering into the fan section 12 is initially compressed and fed to the compressor section 14. In addition, the fan section 12 delivers a portion of the air into a bypass duct B, where it provides propulsion air. In the compressor section 14, the incoming air from the fan section 12 is further compressed and communicated to the combustor section 16. In the combustor section 16, the compressed air is mixed with gas and ignited to generate a hot exhaust stream 28. The hot exhaust stream 28 is expanded through the turbine section 18 to drive the fan section 12 and the compressor section 14. In this example, the gas turbine engine 10 includes an augmenter section 20 where additional fuel can be mixed with the exhaust gasses 28 and ignited to generate additional thrust. The exhaust gasses 28 flow from the turbine section 18 and the augmenter section 20 through an exhaust liner assembly 22.

While one example engine 10 is illustrated, it should be understood that the teachings of this disclosure would extend to any number of other gas turbine engine arrangements, for any number of other applications.

Figure 2:
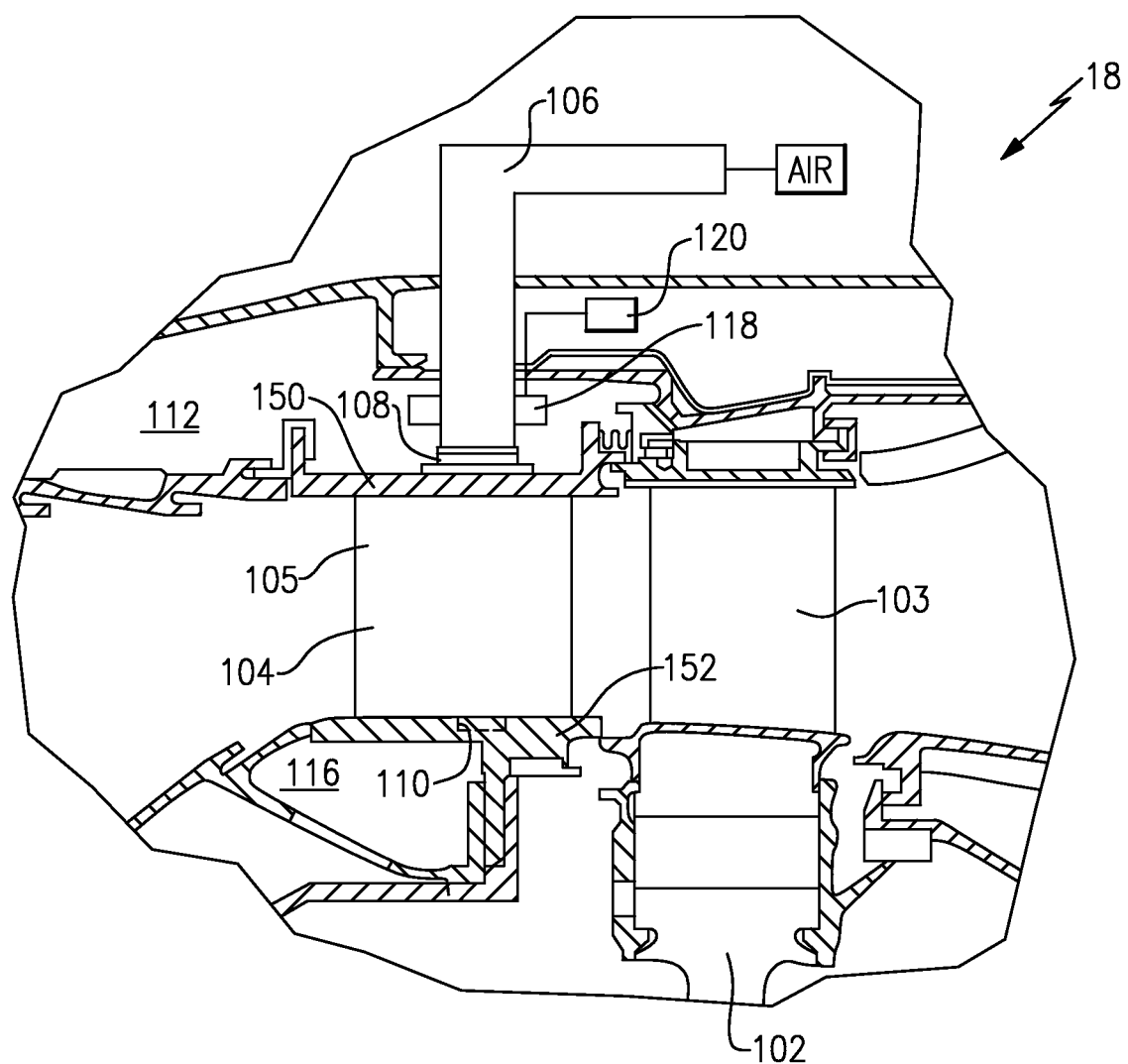
FIG. 2 shows a detail of a turbine.

FIG. 2 shows a portion of a turbine section 18. As shown, a rotating turbine vane 104 is positioned upstream of an upstream turbine rotor 102. It should be understood that there are a plurality of blades 103 on the turbine rotor 102 and a plurality of vanes 104. The vanes 104 are supplied with cooling air through a central spindle 106. An angle of an airfoil 105 on the outer surface of the vanes 104 is varied by a drive mechanism including a drive actuator 118, shown schematically, which can pivot the vane 104, say as through the spindle 106.

A control 120 communicates with the actuator 118 to drive the vanes 104, such that a desired angle of incidence is achieved. Thus, the vane 104 pivots within radially inner housing 152 and radially outer housing 150. The control 120 drives the vanes 104 to change the angle of incidence to change the resistance to flow to the turbine rotor 102. This in turn will control the amount of air delivered into the bypass duct B. In this manner, more or less air can be delivered into the compressor section, to control the amount of thrust provided by the engine 10. These features are generally as known.

Cooling has been supplied to the airfoil 105 through central passages in the spindle 106. Note the spindle could also extend outwardly from the inner periphery. However, bearing races 108 and 110 also face challenges with regard to the high temperature of the products of combustion passing across their surfaces.

As shown in FIG. 2, there is an outer cooling air chamber 112 adjacent an outer bearing race 108 and an inner cooling air chamber 116 adjacent to an inner bearing race 110. These cooling air chambers 112 and 116 receive cooling air, such as from an associated compressor.

The vane 104 and the outer bearing race 108 and inner bearing race 110 are shown in FIG. 3.

Each of the bearing races 108 and 110 include a first radially thicker portion 136 adjacent airfoil 105, a radially thinner portion 138, and a second radially thicker portion 140. The term "radially" should be taken relative to a pivot axis P for the vane 104. As can be seen, posts 109 and 107 are associated with bearing races 108 and 110, respectively, and are mounted in bushings within radially inner housing 152 and radially outer housing 150. Radially inner housing 152 and radially outer housing 150 effectively become vane platforms.

As shown in FIG. 4A, cooling air passages, which may be cooling channels 130 are circumferentially spaced and extend, such as from the second radially thicker portion 140 to the first radially thicker portion 136.

As shown in FIG. 4B, the direction of the cooling channels 130 from the second radially thicker portion 140 to the first radially thicker portion 136 is along a direction that is not parallel to the pivot axis P. Rather, the hole direction D has a component parallel to the pivot axis P and a component extending radially inwardly toward the pivot axis P. Note also that the cooling channel 130 may not extend through the radially thinner portion 138. That is, there is a chamber 901 about the radially thinner portion that acts as an intermediate plenum.

In addition, as can be appreciated from FIG. 4A, the cooling channels 130 are angled circumferentially from an inlet 132 to an outlet 134 in a circumferential direction relative to the axis P. This assists in directing the air along an outer surface of the airfoil 105 as it exits the outlets 134 to assist in providing film cooling.

As can be appreciated from FIG. 4B, the cooling channels 130 extend from a remote facing face 301 associated with the second radially thicker portion 140, and the outlet 134 is in an airfoil facing face 300 of the first radially thicker portion 136. The inlet 132 extends into the remote facing face 301. While the inlet is shown in the remote facing face 301, and the outlet 134 in the airfoil facing face 300, it should be understood that other locations for the inlet and outlet would come within the scope of this disclosure. What is required is simply providing cooling air from the area outwardly of the remote facing face to an area inwardly of the airfoil facing face.

As shown in FIG. 4C, the cooling channels 130 can include convective heat transfer augmentation features 400. The convective heat transfer augmentation features 400 may be pedestals, turbulators, surface bumps, or other known heat transfer augmentation features.

Although FIG. 4C shows the convective heat transfer augmentation features 400 associated only with a portion of the cooling channel 130 in the second radially thicker portion 140, it should be understood that the convective heat transfer augmentation features 400 can also be used in the portion of the cooling channel 130 which passes through said first radially thicker portion 136.

As can be appreciated from FIG. 2, the cooling of the bearing races 108 and 110 produce a heat sink separating the vane 104 from structure position radially beyond the bearing races 108 and 110. As an example, providing cooling to the bearing race 108 isolates the actuator 118 from the hot temperatures experienced by the vane 104. This is because actuator 118 is provided outwardly of bearing race 108 relative to the airfoil 105.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A pivoting turbine vane comprising:
an airfoil, an inner bearing race and an outer bearing race, with said inner and outer bearing races on a pivot axis of the pivoting turbine vane;
cooling air passages through at least one of said inner and outer bearing races to provide cooling air from a remote facing face of said at least one of said inner and outer bearing races to an airfoil facing face of said at least one of said inner and outer bearing races;
wherein both of said inner and outer bearing races are provided with said cooling air passages;
wherein the cooling air passages include said inner and outer bearing races provided with a plurality of cooling channels extending from said remote facing face to said airfoil facing face;
wherein said cooling air passages include cooling channels having an inlet extending into said remote facing face and an outlet in said airfoil facing face;
a radial dimension defined relative to said pivot axis;
wherein said at least one of said inner and outer bearing race each include a first radially thicker portion adjacent said airfoil, and including said airfoil facing face, and a second radially thicker portion spaced in a direction away from said airfoil from said first radially thicker portion, with said cooling channels extending through both said first and second radially thicker portions;
a radially thinner portion intermediate said first and second radially thicker portions, with a chamber defined radially outward of said radially thinner portion, and one said cooling channel extending through said first radially thicker portion and one said cooling channel extending through said second radially thicker portion, and into said chamber spaced radially outward of said radially thinner portion intermediate said cooling channels in said first radially thicker portion and said cooling channels in said second radially thicker portion;
said cooling channels extend from said inlet to said outlet in a direction that is non-parallel to said pivot axis, and said direction includes a component parallel to the pivot axis and another component, which extends radially toward said pivot axis; and
said direction also includes a circumferentially extending angle from said inlet to said outlet, such that air delivered outwardly of said outlet is directed along an outer surface of said airfoil as film cooling.

2. The vane as set forth in claim 1, wherein said cooling channels include convective heat transfer augmentation features.

3. A turbine section for a gas turbine engine comprising:
a turbine rotor and a pivoting turbine vane being positioned upstream of said turbine rotor;
said pivoting turbine vane including an airfoil, an inner bearing race and an outer bearing race, with said inner and outer bearing races on a pivot axis of the pivoting turbine vane;
cooling air passages through at least one of said inner and outer bearing races to provide cooling air from a remote facing face of said at least one of said inner and outer bearing races to an airfoil facing face of said at least one of said inner and outer bearing races;
wherein both of said inner and outer bearing races are provided with said cooling air passages;
wherein the cooling air passages include said inner and outer bearing races provided with a plurality of cooling channels extending from said remote facing face to said airfoil facing face;
a radial dimension defined relative to said pivot axis;
wherein said inner and outer bearing races each include a first radially thicker portion adjacent said airfoil, and including said airfoil facing face, and a second radially thicker portion spaced in a direction away from said airfoil from said first radially thicker portion, with said cooling channels extending through both said first and second radially thicker portions, said cooling channels extend in a direction from an inlet to an outlet that is non-parallel to said pivot axis, and said direction includes a component parallel to the pivot axis and another component, which extends radially toward said pivot axis;
a radially thinner portion intermediate said first and second radially thicker portions, with a chamber defined radially outward of said radially thinner portion, and one said cooling channel extending through said first radially thicker portion and one said cooling channel extending through said second radially thicker portion, and into said chamber spaced radially outward of said radially thinner portion intermediate said cooling channels in said first radially thicker portion and said cooling channels in said second radially thicker portion, and said direction also includes a circumferentially extending angle from said inlet to said outlet, such that air delivered outwardly of said outlet is directed along an outer surface of said airfoil as film cooling.

4. The turbine section as set forth in claim 3, which utilizes convective cooling through the passed through air to produce a heat sink separating hot portions of the pivoting turbine vane from the at least one of said inner and outer bearing races such that the outwardly radial portions of the at least one of said inner and outer bearing races and said pivoting turbine vane is thermally isolated.

5. The turbine section as set forth in claim 3, wherein said cooling channels include convective heat transfer augmentation features.

6. The turbine section as set forth in claim 3, wherein an actuator is provided for pivoting said pivoting turbine vane with said actuator provided outwardly of one of said inner and outer bearing races relative to said airfoil.

\* \* \* \* \*